(12) United States Patent
Ghosh et al.

(10) Patent No.: US 12,455,470 B2
(45) Date of Patent: Oct. 28, 2025

(54) ASSEMBLY AND METHOD FOR ACTIVELY CONTROLLING RADIATION TRANSMISSION

(71) Applicant: The Regents of the University of Colorado, Denver, CO (US)

(72) Inventors: Souvik Ghosh, Boulder, CO (US); Ivan Smalyukh, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 0 days.

(21) Appl. No.: 18/114,782

(22) Filed: Feb. 27, 2023

(65) Prior Publication Data

US 2023/0273474 A1 Aug. 31, 2023

Related U.S. Application Data

(60) Provisional application No. 63/314,190, filed on Feb. 25, 2022.

(51) Int. Cl.
*G02F 1/1334* (2006.01)
*B82Y 30/00* (2011.01)
*C09K 19/52* (2006.01)
*C09K 19/56* (2006.01)
*G08C 23/04* (2006.01)

(52) U.S. Cl.
CPC ............ *G02F 1/1334* (2013.01); *C09K 19/56* (2013.01); *G08C 23/04* (2013.01); *B82Y 30/00* (2013.01); *C09K 2019/528* (2013.01)

(58) Field of Classification Search
CPC . G02F 1/1334; C09K 19/56; C09K 2019/528; G08C 23/04; B82Y 30/00
See application file for complete search history.

(56) References Cited

U.S. PATENT DOCUMENTS

| | | | | |
|---|---|---|---|---|
| 2017/0292073 A1* | 10/2017 | Liu | ........................ | C09K 19/22 |
| 2018/0129086 A1* | 5/2018 | Ohtake | ............... | G02F 1/13725 |
| 2019/0339452 A1* | 11/2019 | Fattal | .................. | G02B 26/0808 |
| 2020/0025981 A1* | 1/2020 | Greer | .................... | B82Y 20/00 |
| 2021/0181522 A1* | 6/2021 | Chang | ................. | G02F 1/13306 |

* cited by examiner

*Primary Examiner* — Michael H Caley
*Assistant Examiner* — David Y Chung
(74) *Attorney, Agent, or Firm* — Snell & Wilmer L.L.P.

(57) ABSTRACT

Assemblies and methods for modulating (e.g., near) infrared radiation are provided. Exemplary assemblies include a composite material interposed between a first substrate and a second substrate. The composite material includes plasmonic nanoparticles (e.g., nanoplates) dispersed in a nematic liquid crystal.

19 Claims, 8 Drawing Sheets

ASSEMBLY AND METHOD FOR ACTIVELY CONTROLLING RADIATION TRANSMISSION

CROSS-REFERENCE TO RELATED APPLICATIONS

This application claims priority to U.S. Provisional Patent Application Ser. No. 63/314,190, filed Feb. 25, 2022, and entitled "ELECTRICAL SWITCHING OF NEMATIC PLASMONIC NANOCOLLOIDS FOR INFRARED SOLAR GAIN CONTROL," the disclosure of which is hereby incorporated by reference in its entirety.

STATEMENT REGARDING FEDERALLY-SPONSORED RESEARCH OR DEVELOPMENT

This invention was made with government support under grant number DE-SC0019293 awarded by the U.S. Department of Energy. The government has certain rights in the invention.

FIELD OF INVENTION

The present disclosure relates generally to assemblies and methods for controlling transmission of radiation. More particularly, exemplary embodiments of the present disclosure relate to methods and assemblies for controlling infrared radiation transmission.

BACKGROUND OF THE DISCLOSURE

Controlling radiation, or more particularly, solar gain is desirable to reduce the energy consumption by residential and commercial buildings, which is responsible for about 40% of all energy generated globally. However, the dynamic control of solar gain in the near infrared, separately from the visible spectral range, has been a challenge. Therefore, improved assemblies and methods for (e.g., independently) controlling radiation in the infrared, and particularly, near infrared region of the electromagnetic spectrum, while maintaining high visible light transparency are desired.

Any discussion, including discussion of problems and solutions, set forth in this section, has been included in this disclosure solely for the purpose of providing a context for the present disclosure, and should not be taken as an admission that any or all of the discussion was known at the time the invention was made or otherwise constitutes prior art.

SUMMARY

This summary may introduce a selection of concepts in a simplified form, which may be described in further detail below. This summary is not intended to necessarily identify key features or essential features of the claimed subject matter, nor is it intended to be used to limit the scope of the claimed subject matter.

In accordance with examples of this disclosure, switchable colloids (SCs, composite material, sometimes referred to simply as composite), dispersions of (e.g., silver nanoplates) in nematic liquid crystals (LCs), which allow for controlling light transmission in the (e.g.) near infrared while maintaining high visible transparency, high color rendering index and low haze, are provided. Assemblies including the composite material and methods of using the assemblies are also provided. Electric switching or modulation of IR radiation can rely on a low-voltage (e.g., about 1-10V) for realignment due to dielectric coupling between the LC director and electric field; thus, energy consumption for switching is relatively low. In accordance with further examples, sub-second switching of the near-infrared-based solar gain can be utilized in installed and retrofit glazing products that include thin films of such composite material confined between (e.g., glass and/or plastic) substrates. Other exemplary applications are discussed in more detail below.

In accordance with various embodiments of the disclosure assemblies and methods for controlling or modulating infrared radiation (e.g., near infrared radiation) through an assembly are provided. The infrared radiation can be controlled independently from radiation in the visible spectrum through the assembly. Assemblies and methods described herein may be particularly well suited for independently controlling or modulating near infrared radiation transmission, while maintaining desired transmission of radiation in the visible light spectrum. Examples described herein in the context of infrared radiation include particular examples of near infrared radiation.

In accordance with embodiments of the disclosure, an assembly for actively controlling infrared radiation transmission comprises a first substrate, a second substrate, and a composite material interposed between the first substrate and the second substrate, the composite material comprising plasmonic nanoparticles dispersed in a nematic liquid crystal. The plasmonic nanoparticles can include, for example, one or more of silver, aluminum, aluminum-doped zinc oxide, and indium tin oxide. The assembly can further include a functionalized coating overlying the plasmonic nanoparticles. Further, the assembly can include a chemical coating overlying the functionalized coating to facilitate alignment of plasmonic nanoparticles within the nematic liquid crystal. The plasmonic nanoparticles can be anisotropic. For example, the plasmonic nanoparticles can have a first (e.g., lateral or length) dimension of between about 100 nm and about 300 nm or about 100 nm and about 200 nm and/or a second (e.g., thickness or width) dimension of between about 10 nm and about 30 or between 10 and 100 nm. In some cases, the plasmonic nanoparticles can have an aspect ratio of between about 5 and about 50. The assembly can further include a plurality of electrodes. The electrodes can be formed on the first substrate, the second substrate, or both the first and second substrates. The assembly can exhibit several desirable properties, such as transparency, little to no haze, color neutrality, and the like.

In accordance with additional embodiments of the disclosure, a method of controlling infrared transmission through an assembly, such as an assembly described herein, is provided. Exemplary methods include applying a bias across the composite material (e.g., using electrodes described herein). The bias can be between, for example, about 1 V to about 10 V. Additionally or alternatively, the infrared light transmission can be modulated by changing incident light polarization. As discussed in more detail below, modulation can be relatively fast—e.g., transmission of the infrared radiation can be switched or modulated in less than one second.

These and other embodiments will become readily apparent to those skilled in the art from the following detailed description of certain embodiments having reference to the attached figures. The invention is not limited to any particular embodiments disclosed.

BRIEF DESCRIPTION OF THE DRAWING FIGURES

A more complete understanding of exemplary embodiments of the present disclosure can be derived by referring to the detailed description and claims when considered in connection with the following illustrative figures.

FIG. 1 illustrates a physical mechanism: a reversible switching of near infrared (NIR) selective transparency using two-dimensional plasmonic colloids homogenously dispersed in an anisotropic fluid such as nematic liquid crystal; b electric switching of a plasmonic-LC composite material inside a planar cell with out-of-plane electrodes; c, d electric switching of plasmonic-LC composite material inside a homeotropic and a planar cell with in-plane electrodes.

FIG. 2 illustrates dispersion of plasmonic nanoparticles (nanoplates) in 4-cyano-4'-pentylbiphenyl (5CB): a solar intensity and absorption of the plasmonic colloids immersed in water plotted as a function of wavelength. The graph shows maximal plasmonic absorption in the IR-A range of the solar spectrum while absorbing minimally in the visible wavelengths b extinction spectra of silver nanoparticles/nanoplates (AgNPs) dispersed in water and 5CB. c transmission electron microscopy image of the AgNPs showing the thin silica shell at periphery of the particles. d, e polarizing optical micrographs of the composite material with N at (d) 45°. e 0° to P, and (f) fark-field micrograph of the composite where AgNPs are dispersed in 5CB host medium.

FIG. 3 illustrates optical response of the AgNP-LC composite: a transmittance versus wavelength plot of the composite in the IR-A range at different applied voltages, b total transmittance of the composite in visible range and change in diffused transmittance of pure 5CB after addition of AgNPs, with and without voltage, c transmittance versus wavelength of the composite in the IR-A range at different polarization angles, and d transmittance spectra of the composite without (0V) and with (10V) voltage compared with three different commercially available coated glass (Cardinals).

FIG. 4 illustrates electric switching of the AgNP-LC composite material: a typical dependencies of the switching time t_on of the composite material at two different voltages when electric field is applied vertically to a 40 µm thick planar cell; b typical dependencies of the switching time t_off of the composite at two different voltages when electric field is turned off; c switching time t_on versus applied voltage U (fitting expression is shown next to the fitting curve—the output change between the two dashed lines (0.1 and 0.9 in FIG. 4a, b) were used to determine the switching times); and d extinction of the composite vs applied voltage (the black arrow marks the threshold voltage Uth).

Figure 1:
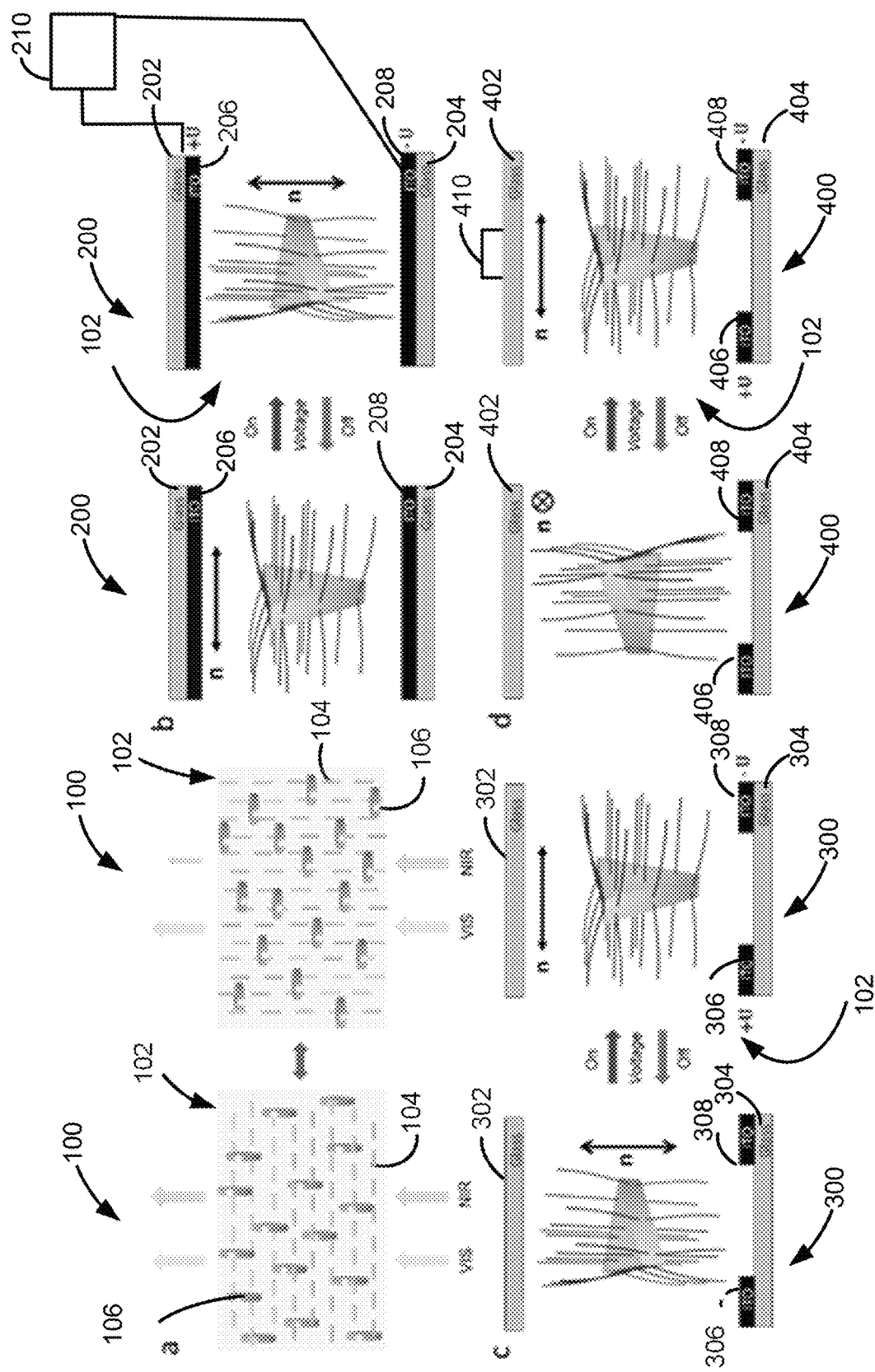

It will be appreciated that elements in the figures are illustrated for simplicity and clarity and have not necessarily been drawn to scale. For example, the dimensions of some of the elements in the figures may be exaggerated relative to other elements to help understanding of illustrated embodiments of the present disclosure.

DETAILED DESCRIPTION OF EXEMPLARY EMBODIMENTS

Although certain embodiments and examples are disclosed below, it will be understood by those in the art that the disclosure extends beyond the specifically disclosed embodiments and/or uses of the disclosure and obvious modifications and equivalents thereof. Thus, it is intended that the scope of the disclosure should not be limited by the particular embodiments described herein.

The illustrations presented herein are not meant to be actual views of any particular material, assembly, structure, or device, but are merely representations that are used to describe embodiments of the disclosure.

In this disclosure, any two numbers of a variable can constitute a workable range of the variable, and any ranges indicated may include or exclude the endpoints. Additionally, any values of variables indicated (regardless of whether they are indicated with the term about or not) may refer to precise values or approximate values and include equivalents, and may refer to average, median, representative, majority, or the like. Further, in this disclosure, the terms including, constituted by and having refer independently to typically or broadly comprising, comprising, consisting essentially of, or consisting of in some embodiments.

As used herein, the term "substrate" may refer to any underlying material or materials that may be used, or upon which a film or layer may be formed.

In this disclosure, any defined meanings do not necessarily exclude ordinary and customary meanings, in some embodiments.

Made from metals, such as silver, plasmonic nanoparticles in colloidal and other dispersions attract a growing fundamental research interest and enable nanoscale lasers, nanotweezers, sensors, cancer therapy, boosted efficiency of solar cells, and the like. These dispersed, individualized plasmonic metal nanoparticles can produce a variety of different colors, with the best-known example being the stained glass in windows of old cathedrals, where colors stem from oscillations of free electrons within the gold nanoparticles, vibrating in phase with each other and influencing absorption and scattering of light. In addition to dispersions in isotropic host media, like glass or water, colloidal dispersions of plasmonic nanoparticles in liquid crystals (LCs) have been demonstrated recently. Such LC colloids of gold nanoplates and nanorods exhibit long-range order imparted by anisotropic interactions of the nanoparticles with rod-like liquid crystalline molecules of the dispersing nematic host medium, as well as inherit its facile switching by external stimuli. However, the demonstrated plasmonic LC colloids were so far limited to gold nanoparticle dispersions and localized surface plasmon resonances (LSPR) were partly or fully within the visible spectral range.

In accordance with examples of the disclosure, nanoparticles (e.g., silver nanoplates, and/or other nanoparticles described herein) dispersed within a LC are used for the solar gain control. When dispersed in a nematic liquid crystal, orientations of such plasmonic (e.g., silver) nanoplates are controlled by application of (e.g., about 1V to about 10 V) low-voltage electric fields, allowing for sub-second switching of the near-infrared-based solar gain. Installed and retrofit products made from thin films of such nanoplate dispersions confined between (e.g., glass and/or plastic) substrates, respectively, exhibit electrically controlled infrared-based solar gain, while retaining high visible-range transparency, low haze and high color rendering index. Thus, assemblies and methods described herein can be used to address window inefficiency in new or existing window assemblies.

To achieve switchable optical transparency in the IR or near-IR part of the solar spectrum, while minimally affecting the visible-range light transmission, a careful consideration of experimental parameters and designs is desired. Exemplary assemblies and methods described herein utilize an all-electrical switching of long range (e.g., inch-scale) self-assembly of two dimensional plasmonic colloids inside a nematic LC host medium.

With reference to FIG. 1, an exemplary assembly 100 includes a composite material 102, which includes plasmonic nanoparticles 106 dispersed in a nematic liquid crystal 104, as illustrated in FIG. 1a. Assemblies 200, 300, and 400, can also include respective substrates 202, 204, 302, 304, 402, 404, and respective electrodes 206, 208, 306, 308, and 406, 408. Assemblies as described herein can be used for actively controlling infrared radiation transmission. Assemblies described herein can also include a power (e.g., a voltage) source 210 coupled to two or more electrodes. During operation, a voltage bias (e.g., from source 210) can applied to at least two electrodes in electrical contact with the composite material to modulate transmission of the infrared radiation.

Nematic liquid crystal 104 can include any suitable nematic liquid crystal material. By way of examples, liquid crystal 104 comprises 4-cyano-4'-pentylbiphenyl (5CB) or other suitable nematic LC, such as MLC-9200-000, MLC-9200-100, MLC-6608, MLC-6241-000, 5PCH, 5CB, TL-216, E7, and E44 to name a few.

Plasmonic nanoparticles 106 can include, for example, nanoparticles formed of or comprising one or more of silver, aluminum, aluminum-doped zinc oxide, and indium tin oxide. In accordance with examples of the disclosure, plasmonic nanoparticles 106 are anisotropic. By way of examples, plasmonic nanoparticles 106 can comprise a first dimension of between about 100 nm and about 300 nm and/or can comprise a second dimension of between about 10 nm and about 30 or between about 10 and about 100 nm. Additionally or alternatively, plasmonic nanoparticles 106 can have an aspect ratio of between about 5 and about 50.

A thickness of the composite material can be between about 10 μm and about 100 μm.

In accordance with examples of the disclosure, an assembly as described herein includes a functionalized coating overlying plasmonic nanoparticles. The functionalized coating can be continuous or non-continuous. Exemplary functionalized coatings can comprise one or more of silica and a polymer. Exemplary polymers suitable for use as a functionalized coating include DMOAP (dimethyloctadecyl[3-(trimethoxysilyl)propyl]ammonium chloride), SDS (sodium dodecyl sulfate), and perfluorocarbon polymers. A thickness of the silica and/or polymer can range from about 5 nm to about 50 nm or about 0.1 to about 10 nm.

In accordance with further examples, an assembly can include a chemical coating overlying the plasmonic nanoparticles and/or the functionalized coating. The chemical coating can facilitate alignment of plasmonic nanoparticles within the nematic liquid crystal. The coating to facilitate alignment can be or include, for example, one or more of DMOAP (dimethyloctadecyl[3-(trimethoxysilyl)propyl]ammonium chloride), SDS (sodium dodecyl sulfate), and perfluorocarbon polymers. The coating can be continuous or non-continuous.

Substrates 202, 204, 302, 304, 402, 404 can be formed of any suitable material. By way of examples, a first substrate (e.g., substrate 202, 302, 402) and/or a second substrate (e.g., substrate 204, 304, 404) can comprise glass, plastic, or any other flexible substrate. Generally, substrates 202, 204, 302, 304, 402, 404 may be transparent, especially in the visible light spectrum. As used herein, transparent means transmitting greater than 80% of the radiation in the respective portion of the electromagnetic spectrum.

Electrodes 206, 208, 306, 308, 406, 408 can similarly be formed of any suitable material. In some cases, one or more electrodes 206, 208, 306, 308, 406, 408 of an assembly are transparent. Exemplary transparent electrode materials include metal oxides, such as indium-tin oxide (ITO). In accordance with examples of the disclosure, assemblies include a plurality of electrodes, which can be on the same and/or different (e.g., first and/or second) substrates 202, 204, 302, 304, 402, 404.

A switching mechanism of assemblies 100, 200, 300, 400 works in a reversible manner. Planar (where LC molecules align in parallel to a substrate) as well as homeotropic (where LC molecules align perpendicularly to a substrate) assemblies can be formed. Both vertical alignment (VA) and in-plane switching (IPS) of assemblies are shown in FIG. 1b-d. The VA mode can be used to switch planar cell, whereas IPS mode enables switching of both planar and homeotropic cell, but uses patterned electrodes on at least one of the substrates. A key difference between these two configurations is in the way the plasmonic colloids are oriented with respect to the applied field.

Figure 2:
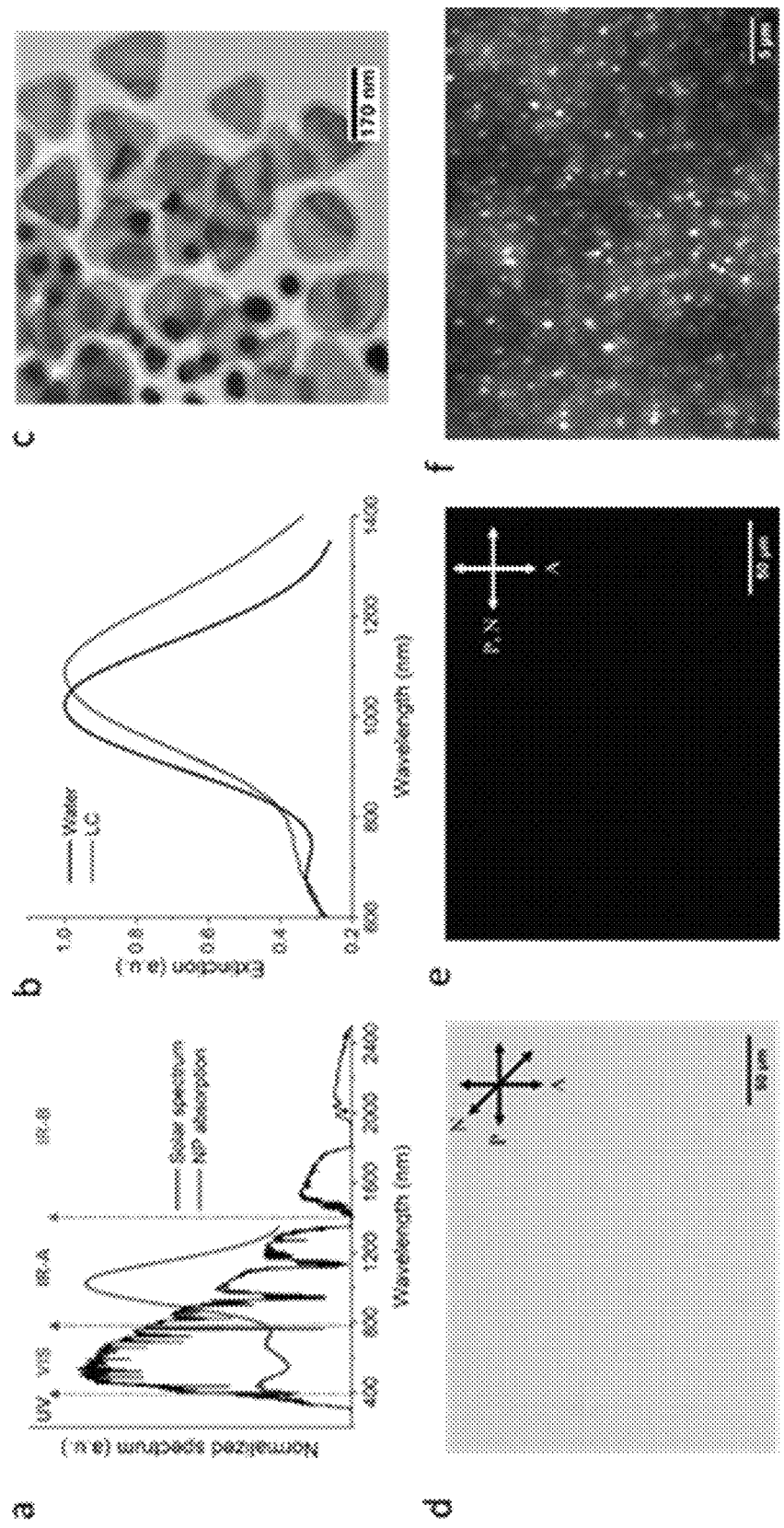
Figure 7:
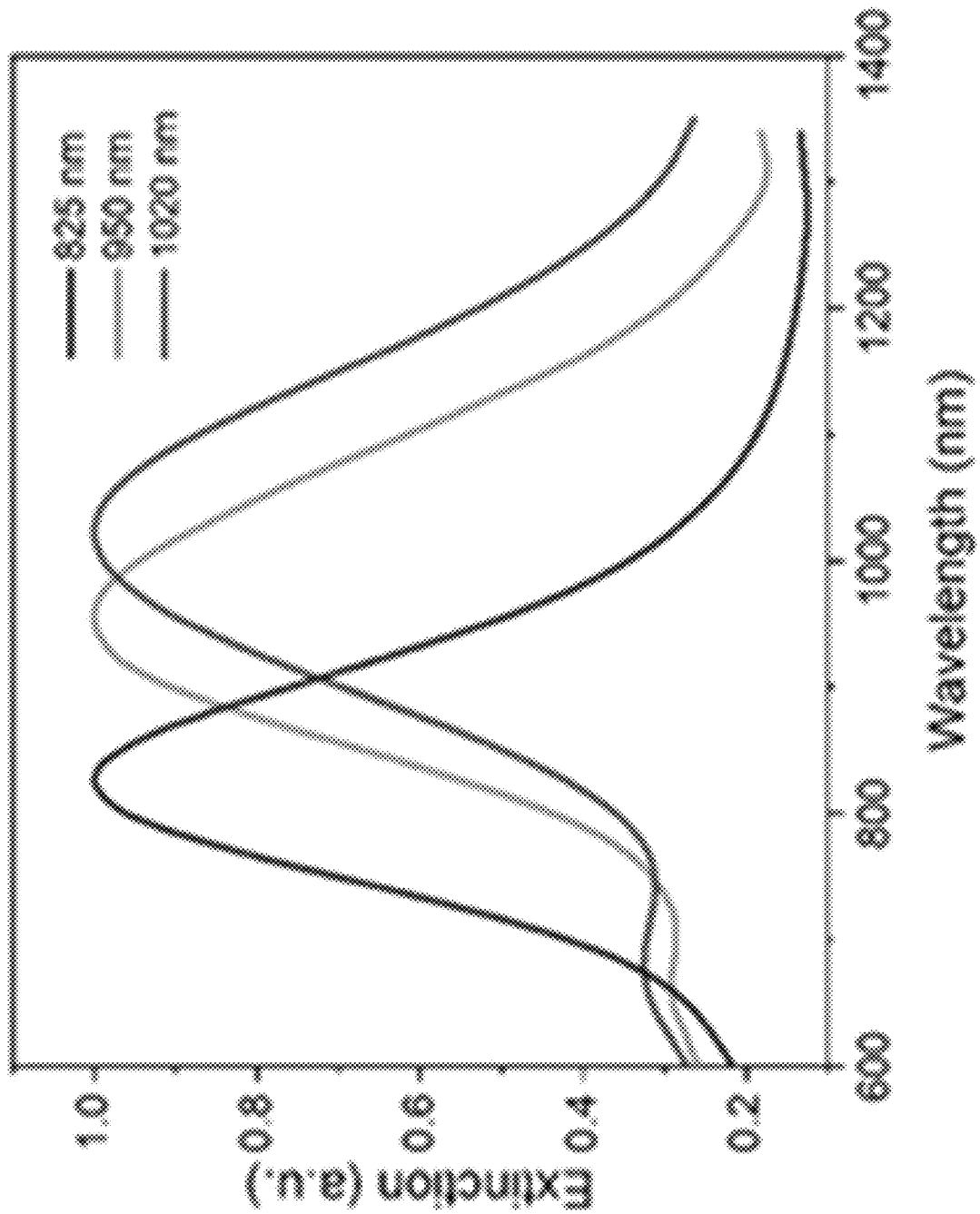
FIG. 7 illustrates extinction spectra vs wavelength for three different sizes of AgNPs.

In the examples described below, plasmonic colloids used are silica coated silver nanoplates (AgNPs) of varying diameter (100-200 nm) and fixed thickness (10 nm). The silica coating protects the inner metal nanoplates and retains their plasmonic properties when integrated into composites, allowing for highly stable nanocolloidal dispersions in a wide range of solvents. Due to the shape anisotropy of our nanocolloids, their longitudinal (incident light polarization P parallel to the nanoplates) and transverse (incident light polarization P perpendicular to the nanoplates) LSPR modes differ from each other, with the former designed to be in the near infrared. The longitudinal LSPR from the excitation of low energy dipole modes is more pronounced than the transverse LSPR mode peaking around 400 nm. In the illustrated examples, three different used AgNPs have average lateral dimensions of 125±18 nm, 159±27 nm and 181±22 nm and longitudinal LSPR spectra peaks around 825 nm, 950 nm and 1020 nm, respectively (See FIG. 7). The broadband NIR extinction spectra are desirable for solar gain control and are primarily due to high polydispersity in shapes and lateral dimensions of the nanoplates. For AgNPs having LSPR peak at 1020 nm, the extinction peak nearly overlaps with the IR-A range (780-1400 nm, defined by the Commission Internationale de l'Eclairage (CIE)) of the solar spectrum, while having minimal absorption in the visible wavelengths, as shown in FIG. 2a. Formulation of mixtures of nanoplate dispersions can allow for further broadening and tuning the infrared spectral characteristics depending on factors, such as climate zones, and the like. The LSPR peak slightly red shifts and the extinction spectra also gets somewhat broadened (FIG. 2b) when the AgNPs are dispersed in a nematic LC host instead of water. The reason is attributed to an increased effective refractive index as well as to the inhomogeneity of its distribution around the AgNPs in a nematic host medium.

To disperse the silica-shelled nanocolloids (FIG. 2c) in the LC, the silica surfaces were treated with a surfactant, such as dimethyloctadecyl[3-(trimethoxysilyl)propyl]ammonium chloride (DMOAP) or other coating to facilitate alignment as described herein, to produce perpendicular surface boundary conditions for anisotropic host LC molecules. When dispersed in nematic LCs, such as 4-cyano-4'-pentyl-biphenyl (5CB), AgNPs align perpendicular to the local nematic director N describing the average orientation of rod-like organic molecules, due to the finite-strength boundary conditions on the nanoparticle surfaces. The monocrystal-like orientational order of LC-AgNP dispersion inside a closed planar cell is observed with polarizing optical microscopy by rotating the sample between two crossed polarizers. FIG. 2d, e confirms that the AgNPs do not perturb the uniform alignment of the LC host. Additionally, dark-field imaging reveals that the AgNPs are dispersed individually and undergo Brownian motion as individual nanoparticles at high mass concentrations greater than 1 mg mL$^{-1}$ thanks to their small size, which induces weak director distortions. Further the electrostatic repulsion from charged DMOAP molecules on the nanoplates surface counterbalance weak elastic attractions among the particles resulting from the distortions.

Figure 3:
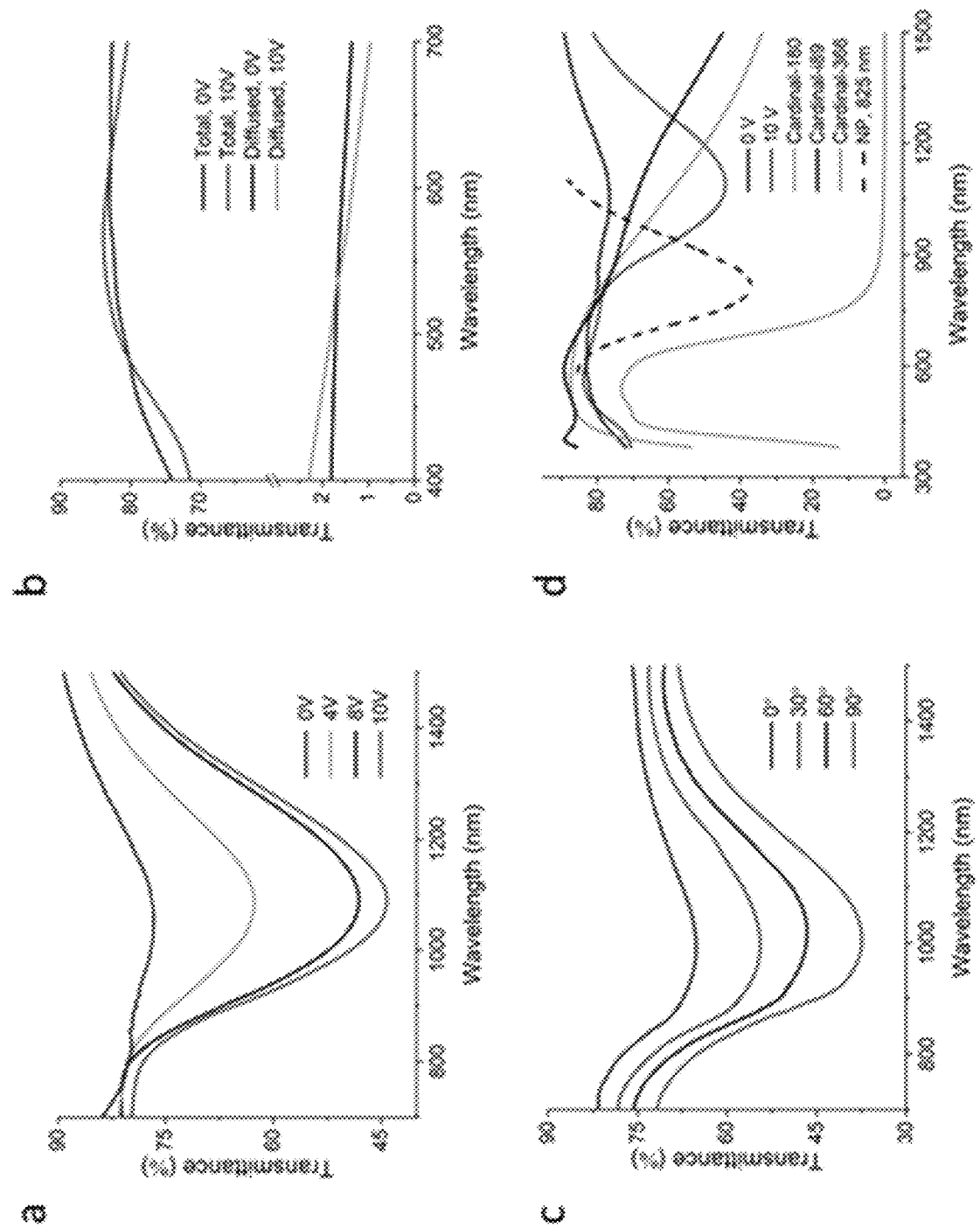

Owing to this long-range orientational order of the composite materials, optical transmittance through the composite depends on the alignment of the nanoparticles. A nematic host LC gives us an opportunity to dynamically tune its orientation in a reversible fashion using low electrical voltage. The dispersed colloids then follow the change in nematic director orientation as the nanoparticle's alignment is mechanically coupled to that of the LC director N. To utilize this facile response to applied electrical stimuli, the dispersions of nanoparticles in 5CB are infiltrated into planar cells made from glass plates coated with transparent and conducting indium tin oxide (ITO) on their inner surfaces. The nanoparticles having homeotropic surface anchoring align perpendicular to the nematic director N. When the cell is illuminated with light polarized along the nematic director N, the transverse LSPR mode is excited providing high NIR transmittance. Subsequently, with application of a finite voltage at frequencies of about 1 kHz in between the ITO surfaces, the nanoparticles reorient themselves vertically as shown in FIG. 1b. As a result, with an increase in voltage, longitudinal LSPR mode dominates, reducing the NIR transmittance as shown in FIG. 3a. At the resonance in NIR light transmission drops about 45% from the initial state leading to 20% overall change in NIR transmittance when the cell is fully switched. The composite remains fairly transparent before and after switching as visible transmittance does not differ much between two orientational states of the nanoparticles (see FIG. 3b). Diffused transmission can also be an important consideration, as diffused transmission corresponds to haze. Minimizing haze may be desirable for practical purposes, such as window application. In accordance with examples of the disclosure, the assembly exhibits a haze of less than 3%.

As illustrated in FIG. 3b, we measure less than 2% change in haze of the assembly, comparing to pristine LC assembly. Despite the concentrated dispersion of nanoparticles, the acceptable change in haze value reiterates the fact that the colloids are uniformly dispersed throughout the composite material. The NIR light transmission through the assembly can also be tuned by rotating the polarization of incident illumination with respect to nematic director N as the unidirectional self-alignment of the nanoparticles in the nematic LC induces polarization-dependent LSPR properties of the entire inch-scale composite, as shown in FIG. 3c. Next, we compare in FIG. 3d, the transmission spectra of our LC-AgNP composite before and after switching with commercially available coated glasses designed for similar purpose. A comparison between the commercial glasses and the composite at different voltages is shown in Table 1 with respect to NIR solar gain coefficient $$SHGC_{NIR} = \frac{\int_{780}^{1400} T(\lambda)E(\lambda)d\lambda}{\int_{780}^{1400} E(\lambda)d\lambda}$$

and Visible light Transmittance $$VLT = \frac{\int_{380}^{780} T(\lambda)V(\lambda)E(\lambda)d\lambda}{\int_{380}^{780} V(\lambda)E(\lambda)d\lambda},$$

where $T(\lambda)$ is wavelength dependent transmission, $E(\lambda)$ is solar irradiance spectra on earth, and $V(\lambda)$ is the spectral response of human eye. Our active composite assemblies not only provides similar visible transparency as the passive coated glasses but offers dynamically tunable NIR solar gain in addition. Interestingly, the 'passive' or 'off' state of the SCs (composite material) can be adapted to use for appropriate climate conditions such as to promote energy saving benefits and reduce the frequency of switching. As shown in FIG. 3b, the VA mode have high NIR transmission in the 'off' state, and therefore may be preferred for regions having long winter. Alternately, in hot climates with short winter where high solar gain is a priority, the IPS configuration as shown in FIG. 1c may be better suited.

TABLE 1

Comparison of visible light transmittance and solar heat gain coefficient between assemblies at different voltages and commercially available passive glasses.

| | VLT | SHGC$_{NIR}$ |
|---|---|---|
| C-180 | 0.8 | 0.65 |
| C-i89 | 0.876 | 0.71 |
| 0 V | 0.831 | 0.8 |
| 4 V | 0.827 | 0.71 |
| 8 V | 0.825 | 0.63 |
| 10 V | 0.823 | 0.6 |

Figure 4:
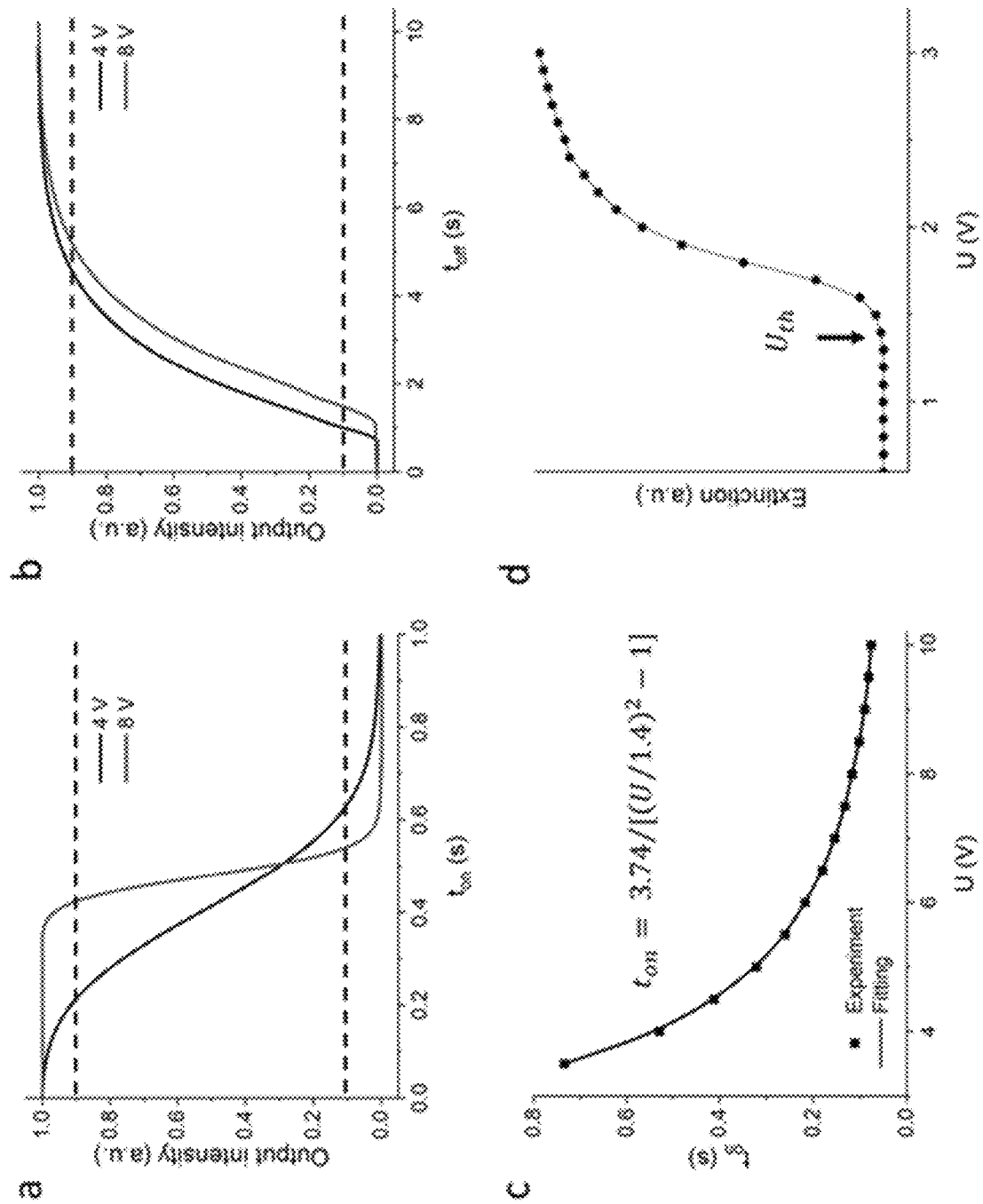
Figure 8:
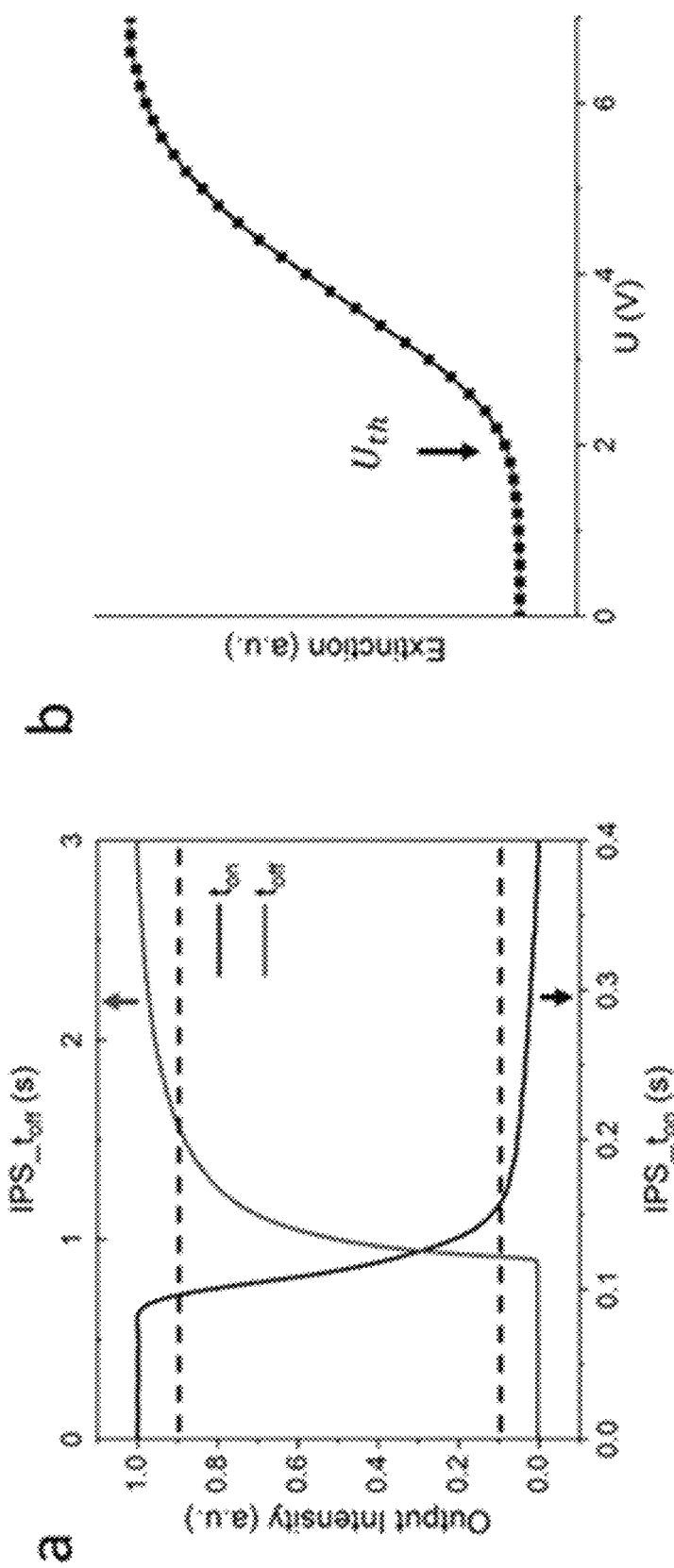
FIG. 8 illustrates: an in-plane switching (IPS) response time of the composite material inside a planar cell (40 µm) and b extinction of the composite vs applied voltage. The black arrow marks the threshold voltage.

Composite material (e.g., composite material 102) reacts to an applied electrical field in a similar way the pure LC responds. FIG. 4a, b illustrates the electric switching response time of the LC-AgNP composite material inside a planar assembly for two different voltages, 4V and 8V applied vertically. As pristine LC, with onset of voltage the optical output of the composite varies nonmonotonously over sub-second timescale. With increase in applied voltage, switching happens faster thereby reducing the response time $t_{on}$. Subsequently, when the electric field is taken away, switching happens over a significantly longer duration and the response time $t_{off}$ is independent of applied voltages (see FIG. 4b). The response times are measured from transmitted intensity changes between 10% and 90%, as marked by dotted lines in FIGS. 4a, b. For a 40 μm thick composite material at a typical applied voltage of 8V, $t_{on}$ and $t_{off}$ are found out to be 0.117 s and 3.74 s, respectively. Likewise, for an IPS assembly with cell gap and applied voltage as previous, we observe similar response times (see FIG. 8). However, the threshold voltage $U_{th}$ for switching is different in these two scenarios. In case of VA mode, $U_{th}$ from the extinction versus applied voltage plot (FIG. 4c) is found out to be 1.4 V while in IPS mode the threshold voltage increases close to 2 V as measured from FIG. 8. Next, we observe from FIG. 4c, that $t_{on}$ is reducing with increase in applied voltage which can be fitted with the theoretical formula for pristine LCs $t_{on}=t_{off}/[(U/U_{th})^2-1]$, where $U_{th}$ is the threshold voltage required for switching. From fitting, the threshold voltage is estimated to be 1.42 V which closely matches with the value obtained from extinction versus applied voltage plot. This value of $U_{th}$ for the composite is marginally higher than the pristine 5CB as concentrated dispersions of metal nanoparticles can slightly influence LC properties. Similar modification can happen to the viscoelastic properties of the host LC as well. The rotational viscosity $\gamma_1$ of our LC-AgNP composite is found out to be 147 mPa S from the theoretical formula $t_{off}=\gamma_1 d^2/K_{11}\pi^2$ where d is cell gap and $K_{11}$ is splay elastic constant, which is also increased a bit as compared to $\gamma_1 \approx 81$ mPa S of pristine 5CB.

Figure 5:
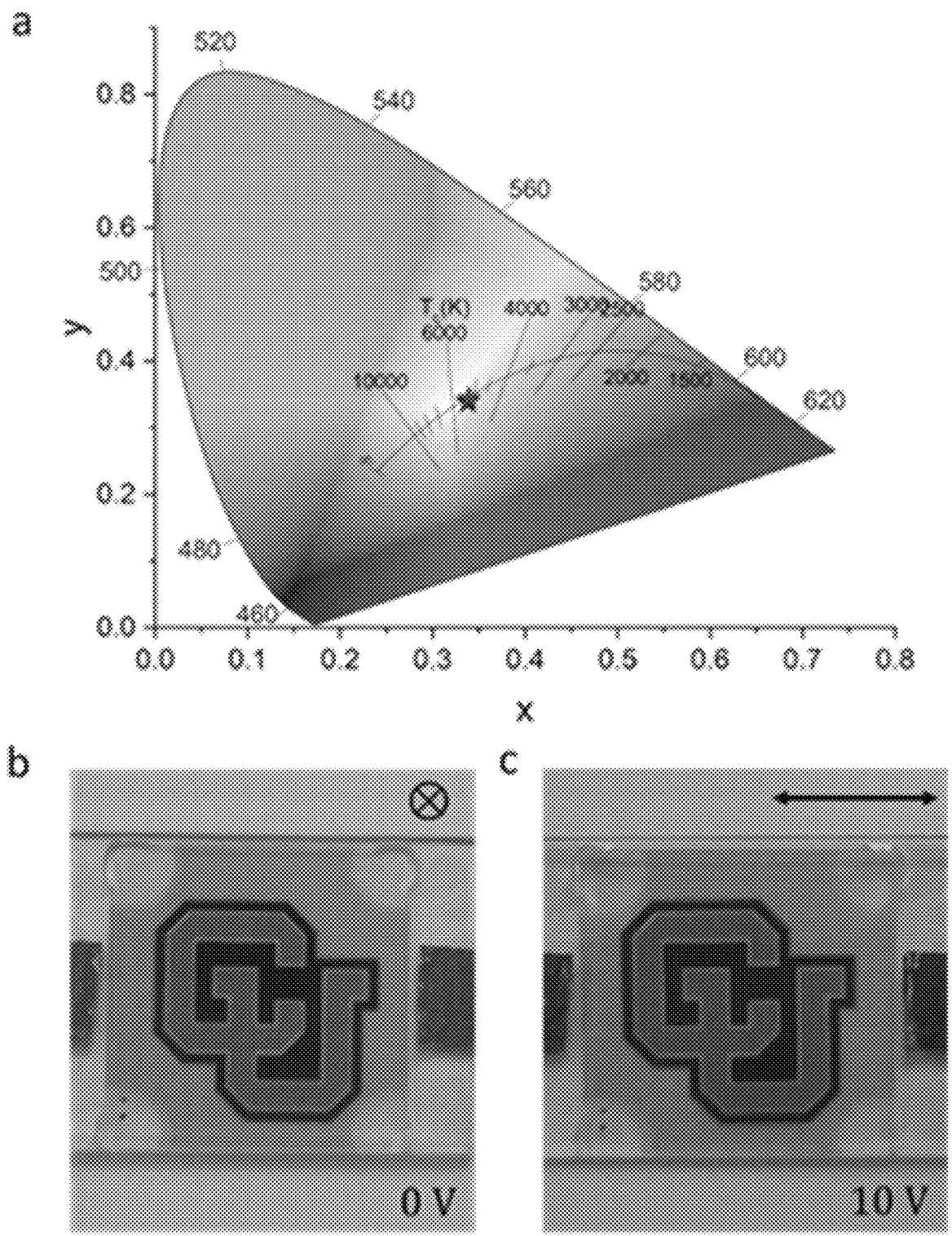
FIG. 5 illustrates chromatic response of the composite material: a perceived color and color temperature of the cell with the composite in between two ITO-coated glass substrates represented in CIE1931 chromaticity diagram (the black and red star represents the data at 0 V and 10 V, respectively). b, c Photograph of a typical 40 µm thick cell that is represented in (a) with 0V and 10V.

An important factor for practical purposes particularly for window application is aesthetically acceptable neutral colors. To quantify color neutrality, we calculated color perception indices using CIE 1931 xy color space, designed to represent human visual color perception. As shown in FIG. 5a, the AgNP-LC composite assembly has chromaticity coordinates of (0.3384, 0.3384) as obtained from the transmitted light through the assembly, which changes slightly to (0.3374, 0.3413) with application of voltage. In both cases the chromaticity coordinates seat in the low colorfulness region of the chromaticity diagram, representing excellent color-neutrality. As used herein, color neutral means when the human eye has difficulty in distinguishing the color of the object; the appearance is perceived as grey. In accordance with examples of the disclosure, transmission of light through the assembly is color neutral.

Moreover, the composite assembly achieves a color-rendering index of CRI=87 (0V) and 89 (10V). This high CRI value indicates that illumination through the cell accurately renders the true color of an object. Similar color neutrality was also observed from photographs of an IPS assembly switched from homeotropic to planar state as shown in FIGS. 5b, c. The CU logo is clearly visible without any noticeable change in color from both the pictures. A uniform tinting effect is present due to reduced visible transmission; however that does not depend on the SC orientation.

Figure 6:
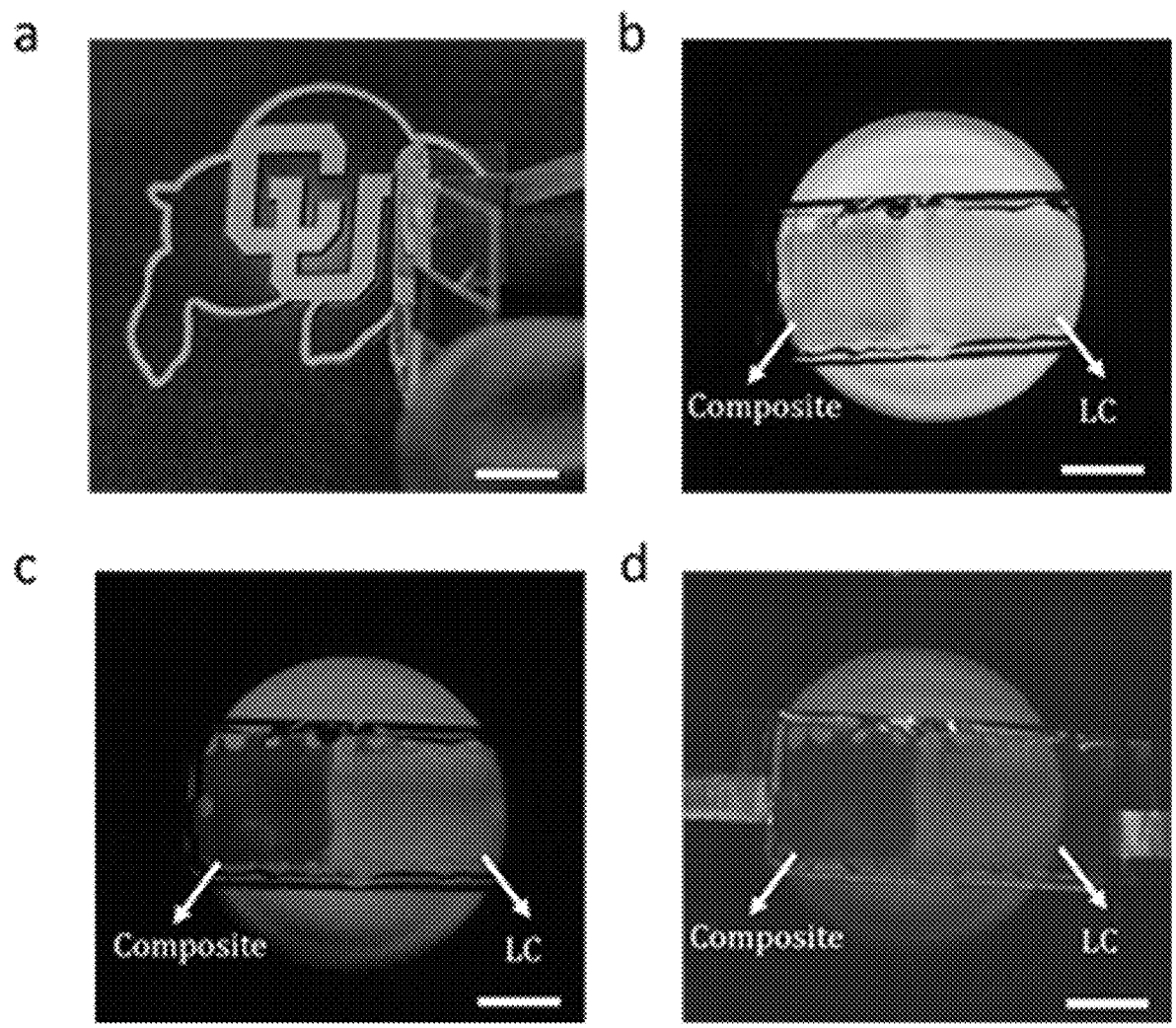
FIG. 6 illustrates optical performance of the composite inside a flexible cell: a photograph of an AgNP-LC composite material inside an ITO-coated PET substrate; b photograph of the cell under visible light illumination; c infrared photograph of the cell with backlit illumination; and d full spectrum photograph of the cell with infrared backlit illumination. All scale bars are 1 cm.

Beyond glass we have tested our composite material and assemblies with flexible substrates as well. This is beneficial for a number of applications where the composite material can be adapted to specific surface requirements, thereby promoting the versatility of its use. As shown in FIG. 6a, an AgNP-LC composite material is infiltrated into flexible cells made from optically clear polyethylene terephthalate (PET) film sheets that have a conductive ITO-coating on one or more inner sides. The cell is divided into two parts containing the composite and pure LC in respective compartments. To observe direct visual comparison among the two parts in visible and NIR wavelengths, the flexible cell is illuminated by a tungsten-halogen lamp that generates a continuous spectrum of light from the central ultraviolet through the visible and into the infrared wavelength regions. As can be seen from FIG. 6b, under visible light illumination the two parts appear nearly identical having low contrast in between them. However, in the NIR the contrast between the two sides increased noticeably, confirming the low NIR transmission through the composite (see FIGS. 6c, d) while the compartment with pure LC appears optically transparent.

Exemplary applications and uses of assemblies described herein include: (i) due to the low voltage switching, the assemblies can be powered by a battery or a solar cell without requiring additional electrical wiring in the building; (ii) various assembly configurations can incorporate different plasmonic colloids with pre-designed LSPR properties at desired wavelengths of operation, as well as a co-dispersed combination of the nanoparticles may increase a bandwidth of modulation; (iii) a higher concentrations of plasmonic nanoparticles can be used to enhance the tinting effect and, thus, increase the solar gain control, which may eventually allow for blocking near-IR transmissivity completely; (iv) assemblies can include privacy control functionality, e.g. by co-dispersing the plasmonic nanoparticles with other nanoparticles or dyes while producing aesthetically appealing colors; (v) assemblies can include intensity or temperature sensors 410 to allow for automating adjusting the solar gain control, depending on the surrounding environment and personal comfort choices; (vi) assemblies can harvest a significant portion of the scattered solar energy from the assemblies for energy generation; (vii) include dyes that will allow aesthetically appealing colors of the composite material. Part of the radiation can get trapped inside the assembly substrate by total internal reflection that can subsequently be guided towards the photovoltaic cells placed along the edges. A similar mechanism may be feasible also for the absorbed solar energy using thermophotovoltaics.

The examples above and below demonstrate a visibly transparent NIR-selective optical modulation at sub-second switching speed with excellent color neutrality. Previous efforts with LC-based NIR light modulation were either static or limited by one or more of narrow bandwidth, considerable haze or high electrical voltage.

As noted above, a method of controlling or modulating (e.g., near) infrared transmission through an assembly can include applying a bias across the composite material (e.g., using electrodes described herein). The bias can be between, for example, about 1 V to about 10 V. The modulation can be relatively fast—e.g., transmission of the infrared radiation can be switched or modulated in less than one second. Additionally or alternatively, the (e.g., near) infrared light transmission can be modulated by changing incident light polarization. As noted above, the transmission of light through the assembly can be color neutral.

Specific Examples

Specific examples are provided below. The examples below are merely exemplary and illustrative. Unless noted otherwise, the examples are not to be viewed in a limiting sense. Similar methods and materials can be used for other plasmonic nanoparticles, nematic liquid crystal, functionalized coatings, and/or chemical coatings described herein.

Materials and Methods

Dispersion of Colloidal Nanoparticles

We have used silica-shelled (coated) silver nanoplates provided by nanoComposix (San Diego) in 1 mg mL$^{-1}$ mass concentration in an aqueous 10 mM sodium bicarbonate buffer. The particles were at first washed once with DI water and twice with ethanol. In the next step, the nanoparticles were surface-functionalized by DMOAP through a two-step method. First, 0.1 mL of nanoparticle solution was mixed with 0.9 ml ethanol. After that, 10 µL of the ethanol solution of (3-mercaptopropyl)trimethoxysilane (MPTMS) (10% in volume) was added to the solution. The mixture was sonicated for 20 min, centrifuged at 7000 rpm for 10 min and then redispersed in 1 mL of methanol. Then few drops of DMOAP (60 wt % in methanol, from Acros Organics) was added to achieve a 1% mass concentration. The mixture was sonicated for another 20 min, washed and centrifuged and washed three times at 7000 rpm for 10 min in methanol. Finally, the nanoparticles are redispersed in methanol to achieve 1 mg mL$^{-1}$ mass concentration. This as-prepared colloidal dispersion was stored in refrigerator and used in desired amount for experiment. In a typical experiment, 30 µL of nanoparticle solution is mixed with 20 µL of pure 4-cyano-4'-pentylbiphenyl (5CB, from Chengzhi Yonghua Display Materials Co. Ltd.) at room temperature. The mixture was kept inside an oven at 80° C. until all the methanol was fully evaporated. The resultant isotropic mixture was sonicated in a water bath at 80° C. for 4 min and then quenched to nematic phase while agitated mechanically. This was followed by centrifugation at 2000 rpm for 3 min to separate out the aggregates formed during LC phase transition, resulting in a uniform colloidal dispersion.

Sample Fabrication

The assemblies were prepared using glass substrates coated with transparent indium tin oxide (ITO) electrodes on the inner surfaces for application of electric field. We used two types of ITO coatings as electrodes to design our experiments. The uniformly coated ITO thin film covering the entire glass surface was used to apply electric field perpendicular to the glass substrates (for out-of-plane switching) and the micropatterned ITO coating was used to apply electric field tangential to the glass surface (for in-plane switching). To prepare assemblies with planar surface anchoring, the ITO-coated surfaces were spin-coated with 1 wt % aqueous polyvinyl alcohol (PVA, from Sigma Aldrich) and baked at 100° C. for 1 hr. The PVA-coated surfaces were then rubbed unidirectionally with a velvet cloth to define the direction for the director n and then glued together with UV-curable NOA-65 glue (Norland Products, Inc.) containing 40 µm silica spacers to define the desired cell gap. For the homeotropic LC cells, the ITO-patterned surfaces of the glass plates were spin-coated with a polymer SE5661 and baked at 185° C. for 1 hr. The following steps were the same as preparing planar cells without any rubbing. The actual local thickness of the LC cells was measured by an optical interference method. To prepare flexible LC panel, the 5CB-NP composite was sandwiched between two ITO-coated PET films (from Thorlabs) having desired surface anchoring conditions.

Electro-Optical Characterization

For optical microscopy observations, we used an Olympus BX-51 upright polarizing optical microscope with 10× air objective having a numerical aperture 0.3 and a CCD camera (Pointgrey). For darkfield imaging, the sample was illuminated with an oil-immersion dark-field condenser (numerical aperture of 1.2) and the highly scattered light was collected with a 100×, variable numerical aperture (0.6-1.3) oil immersion objective and imaged with another monochrome CCD camera (Spot Pursuit, Diagnostic Inc.). The extinction and transmission spectra were studied using two separate spectrometers dedicated for visible (Silver Nova, Stellernet Inc.) and NIR wavelengths (Dwarf Star, Stellernet Inc.) mounted on the microscope. Broad spectrum light was collected using Y-type optical fiber which was coupled to both the spectrometers. Electric switching of the composite was characterized using a data acquisition system (USB-6259, National Instruments Co.) controlled by a homemade software written in LabVIEW (National Instruments Co.), and a Si-amplified photodetector (PDA100A2, Thorlabs Inc.). For the switching time measurement of the mixture of 5CB and silver nanoplates, visible light filters were used to block visible light spectra and allow only the NIR light that includes the longitudinal LSPR peak of the nanoparticles. Photographs of the flexible cells were taken with Nikon D3200 camera. The IR photographs were taken using 850 nm long pass filter.

The example embodiments of the disclosure described above do not limit the scope of the invention, since these embodiments are merely examples of the embodiments of the invention. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

The invention claimed is:

1. An assembly for actively controlling infrared radiation transmission, the assembly comprising:
    a power source;
    a first substrate having a plurality of electrodes thereon, the plurality of electrodes coupled to the power source;
    a second substrate;
    a composite material interposed between the first substrate and the second substrate, the composite material comprising plasmonic nanoparticles dispersed in a nematic liquid crystal;
    a functionalized coating overlaying the plasmonic nanoparticles, the functionalized coating comprising silica; and
    a chemical coating overlaying the functionalized coating, the chemical coating comprising one or more of dimethyloctadecyl[3-(trimethoxysilyl) propyl]ammonium chloride (DMOAP), sodium dodecyl sulfate (SDS), and perfluorocarbon polymers,
    wherein the plasmonic nanoparticles comprise one or more of aluminum, aluminum-doped zinc oxide, and indium tin oxide, and
    wherein the plasmonic nanoparticles are anisotropic.

2. The assembly of claim 1, wherein transmission of the infrared radiation is switched or modulated in less than one second.

3. The assembly of claim 1, wherein a transmission of light through the assembly is color neutral.

4. The assembly of claim 1, wherein the plasmonic nanoparticles comprise a first dimension of between about 100 nm and about 300 nm.

5. The assembly of claim 4, wherein the plasmonic nanoparticles comprise a second dimension of between about 10 nm and about 100 nm.

6. The assembly of claim 1, wherein the nanoparticles comprise nanoplates.

7. The assembly of claim 1, further comprising an electrode on the second substrate.

8. The assembly of claim 1, wherein the plasmonic nanoparticles comprise one or more of silver, aluminum-doped zinc oxide, and indium tin oxide.

9. The assembly of claim 1, wherein the plasmonic nanoparticles comprise one or more of aluminum-doped zinc oxide and indium tin oxide.

10. The assembly of claim 1, wherein the functionalized coating has a thickness from about 5 nm to about 50 nm.

11. The assembly of claim 1, wherein the composite material is transparent to visible light.

12. The assembly of claim 10, wherein the chemical coating facilitates alignment of plasmonic nanoparticles within the nematic liquid crystal.

13. The assembly of claim 1, wherein, during light transmission comprising infrared radiation and visible light through the assembly, the infrared radiation transmission is controlled within less than one second and independently of visible light transmission through the assembly.

14. The assembly of claim 1, wherein a voltage bias is applied to at least two electrodes in electrical contact with the composite material to modulate transmission of the infrared radiation.

15. The assembly of claim 1, wherein a thickness of the composite material is between about 10 μm and about 100 μm.

16. The assembly of claim 1, wherein the assembly exhibits a haze less than 3%.

17. The assembly of claim 1, wherein one or more of the first substrate and the second substrate comprise glass, plastic, or any other flexible substrate.

18. A method of controlling infrared transmission through the assembly of claim 1, comprising applying a bias across the composite material.

19. The method of claim 18, wherein the bias is between 1 V to 10 V.

* * * * *